Nov. 7, 1950  J. M. BOWMAN ET AL  2,528,683
TRACTOR FENDER
Filed March 29, 1948  2 Sheets-Sheet 1
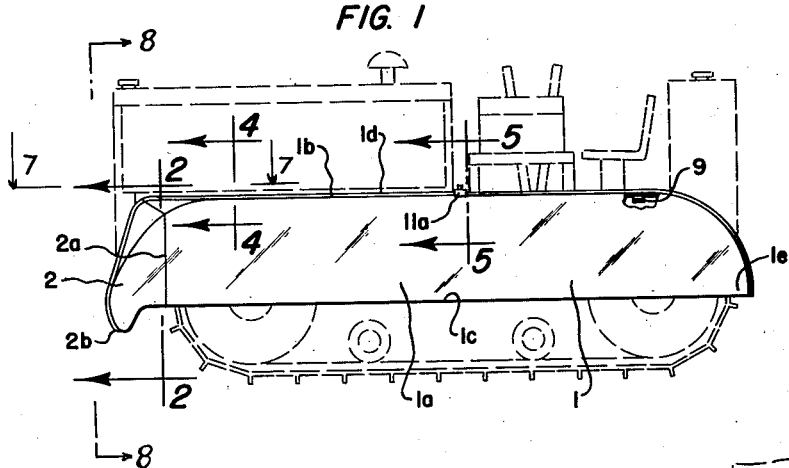
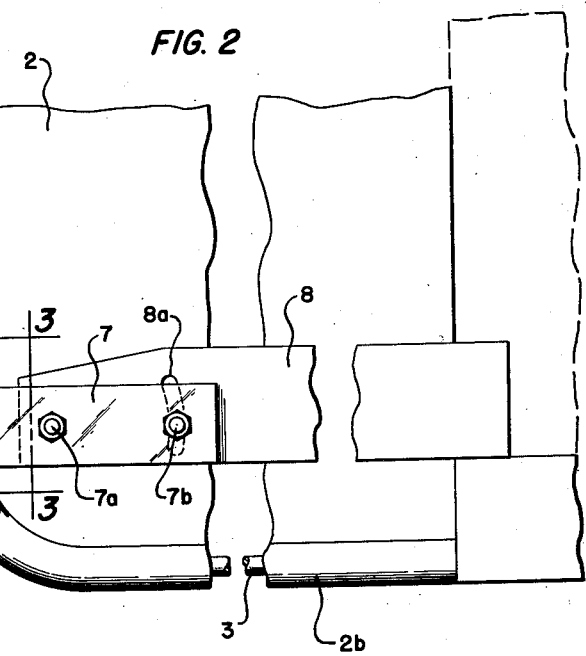
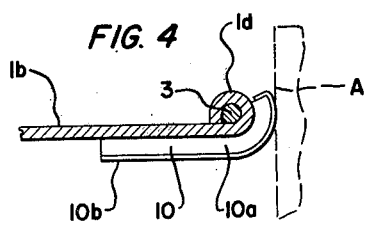
INVENTORS
JOHN M. BOWMAN &
PAUL D. BRADFIELD
BY
Wm. H. Dean
AGENT Nov. 7, 1950    J. M. BOWMAN ET AL    2,528,683
TRACTOR FENDER
Filed March 29, 1948    2 Sheets-Sheet 2
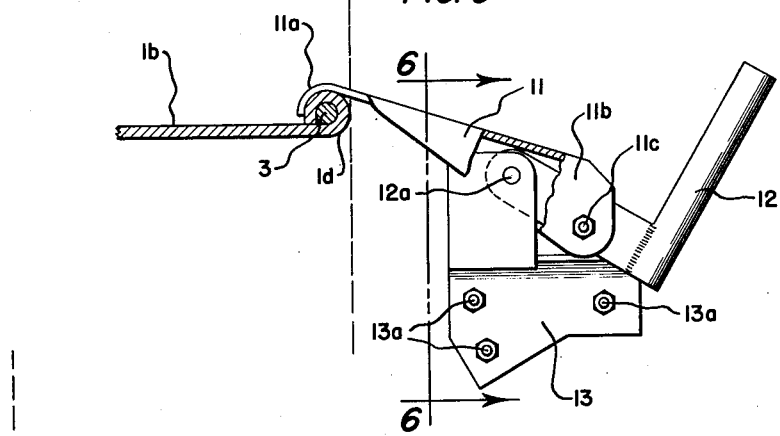
FIG. 5
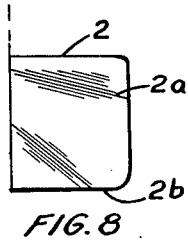
FIG. 8
FIG. 6
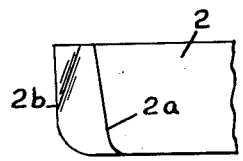
FIG. 7
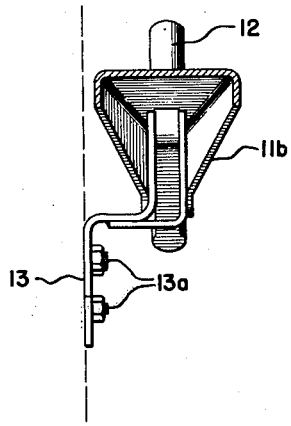
INVENTORS
JOHN M. BOWMAN &
PAUL D. BRADFIELD
BY
Wm. H. Dean
AGENT Patented Nov. 7, 1950

2,528,683

UNITED STATES PATENT OFFICE 2,528,683

TRACTOR FENDER

John M. Bowman and Paul D. Bradfield,
Santa Ana, Calif.

Application March 29, 1948, Serial No. 17,775

12 Claims. (Cl. 280—152)

Our invention relates to a tractor fender, more particularly for use in connection with a track laying tractor, and the objects of our invention are:

First, to provide a fender of this class having novel hinge construction, the axis of which is very close to the outer plane of the tractor tracks, whereby the fender may be pivoted in close proximity to said tracks, and is therefore extended a minimum distance beyond the outer side of the tracks;

Second, to provide a fender of this class having a heavy edge bead rod reinforcing the outer edges of the tractor, which passes through the supporting hinge at each end of the fender greatly strengthening the fender at the hinge location, and preventing the same from cracking near the hinge on which each opposite end of the fender is supported;

Third, to provide a fender of this class having novel toggle and bumper pad means, which maintain certain stress on the fender holding the hinges and bumper pads very firmly in place whereby vibration of the fender and resultant fatigue of the various structure thereof, is reduced to a minimum;

Fourth, to provide a tractor fender of this class having a separate nose section, which is independently formed from the fender body, permitting a choice of methods in fabricating the nose section, with consequent increased production;

Fifth, to provide a fender of this class having a nose section curving downwardly below the hinge axis of the fender, supporting additional shield area to low-hanging limbs of orchard trees, whereby tracks of the tractor do not damage such low-hanging limbs;

Sixth, to provide a tractor fender of this class having novel hinge and bracket means, providing for very simple operations in making the necessary adjustments of the fender relatively to the tractor;

Seventh, to provide a tractor fender of this class in which a bumper pad near each end of the tractor fender at its upper edge engages structure of the tractor intermediate which a toggle clamp tends to pull the upper bead of the fender inwardly toward the tractor, whereby sufficient stress is set up in the fender to maintain the same in very rigid relationship with the tractor at all times; and Eighth, to provide a tractor fender of this class which is very simple and economical of construction, efficient in operation and which will not readily deteriorate or get out of order.

With these and other objects in view, as will appear hereinafter, our invention consists of certain novel features of construction, combination and arrangement of parts and portions, as will be hereinafter described in detail, and particularly set forth in the appended claims, reference being had to the accompanying drawings and to the characters of reference thereon forming a part of this application, in which:

Fig. 1 is a side elevational view of our tractor fender, showing portions thereof broken away and in section to amplify the illustration, and illustrating by dash lines the tractor on which said fender is supported. Fig. 2 is an enlarged fragmentary sectional view, taken from the line 2—2 of Fig. 1. Fig. 3 is a fragmentary sectional view taken from the line 3—3 of Fig. 2, showing portions further broken away and in section beyond the plane of the sections. Fig. 4 is an enlarged fragmentary sectional view taken from the line 4—4 of Fig. 1. Fig. 5 is an enlarged fragmentary sectional view taken from the line 5—5 of Fig. 1. Fig. 6 is an enlarged fragmentary sectional view taken from the line 6—6 of Fig. 5, Fig. 7 is a fragmentary top or plan view of the fender, taken from the line 7—7 of Fig. 1; and Fig. 8 is a front elevational view of the fender, taken from the line 8—8 of Fig. 1.

Similar characters of reference refer to similar parts and portions throughout the several views of the drawing. The fender body 1, fender nose section 2, bead rod 3, hinge spacers 4 and 5, hinge sleeves 6, hinge arm 7, supporting bracket 8, bumper pads 9 and 10, toggle hook 11, toggle lever 12, bracket 13 and the bushing 14 constitute the principal parts and portions of our tractor fender.

The fender body 1 is angular in cross-section, having a side skirt portion 1a and a horizontally disposed top plate portion 1b, at the front end of which is connected the fender nose section 2. This fender nose section 2 is fabricated of a separate piece and is welded to the forward edges of the side and top plate portions 1a and 1b respectively. It will be noted that these side plate and top plate portions 1a and 1b of the fender body 1 may be made of a single piece of flat sheet metal, while the nose section 2 may likewise be made of a single flat sheet of metal, and either formed by dies or by contour layout and welding processes. The top plate portion 1b at the rear of the fender body 1 is curved downwardly and welded to the side plate portion 1a at the corner of the fender on a plane with the side plate 1a. The nose section 2 is provided with a down and forwardly curved portion 2b extending substantially below the lower edge 1c of the fender body 1, all as shown best in Figs. 1 and 2 of the drawings. The bead rod 3 is rolled in the edge portions of the fender body 1 and the nose section 2 at the lower edge 1c of the fender body 1, at the inner edge 1d of the top plate portion 1b of the fender body 1, and around the lower edge 2b of the nose section 2, all as shown best in Figs. 1, 2 and 4 of the drawings. Thus the edges of the fender are reinforced by the bead rod 3, totally surrounded by the sheet metal of the fender body 1 and the nose section 2. The hinge spacers 4 and 5 are threaded on the bead rod 3 over the bushing 14 and welded thereto. These spacers, however, are welded at their ends adjacent the rolled portion 2c at the lower edge of the nose section 2 at its outer side, parallel to the plane of the side plate 1c of the fender body 1. Thus penetration of the weld adjacent the hinge spacers 4 and 5 provides an integral bond for the bead rod 3, the spacers 4 and 5, bushing 14 and the rolled edge 2c of the nose section 2 surrounding the bead rod 3. Thus the reinforcing bead rod 3 is uninterrupted in its extension around the lower edge of the fender and the hollow tubular hinge sleeve 6 is freely pivotally mounted on the bushing 14 around bead rod 3 intermediate the spacers 4 and 5, as shown best in Fig. 3 of the drawings. This construction provides for a very compact hinge mechanism, which maintains the hinge axis very close to the outer edges of the tractor tracks, so that downward pivotal movement of the fender about the axis of the hinge formed by the bead rod 3 does not cause any interference of the lower edge of the fender with the tracks. The hinge arm 7 is welded at its outer end to the hinge sleeve 6 and is adjustably connected at its inwardly extending portions to the supporting bracket 8, rigidly connected to the tractor and extending transversely of the front end thereof, all as shown best in Figs. 2 and 3 of the drawings. This hinge arm 7 is pivotally mounted to the extending end of the supporting bracket 8 by means of the bolt 7a. A second bolt 7b extends through the hinge arm 7 in spaced relationship to the bolt 7a and is projected through an arcuate slot 8a in the bracket 8, which arcuate slot is formed about the radial point of the bolt 7a, facilitating adjustment of the hinge structure on the axis of the bead rod 3, upwardly or downwardly, in accordance with the particular requirements of the tractor to which the fender is connected. The fender body 1, as shown in Fig. 1 of the drawings, is provided with hinge structure of similar construction to that shown in Figs. 2 and 3 of the drawings, at substantially the location 1e, so that each end of the tractor fender is properly supported in pivotal relationship with the tractor, permitting pivotal movement of the entire fender outwardly and downwardly about the axis of the bead rod 3 rolled in the lower edge 1c of the side plate 1a of the fender body 1. The bead rod 3 rolled in the bead roll 1d at the inner edge of the top plate 1b of the frame of the fender body 1 is spaced from the side a of the tractor by bumper pads 9 and 10, shown in Figs. 1 and 4 of the drawing. These bumper pads are identical in contruction, and the bumper pad 10 shown in Fig. 4 of the drawing is provided with a resilient layer 10a, preferably made of fabric and rubber, extending underneath the top plate 1b and upwardly around the beaded edge 1d of the fender body 1. Outwardly of this layer 10a is a metal shield 10b, adapted to resist abrasion of the bumper plate 10 at the surface A of the tractor when clamped into position thereagainst by the toggle clamp as shown in Figs. 5 and 6 of the drawings. The toggle hook 11 is provided with a hook portion 11a on its outer end, having curvature therein conforming to the contour of the beaded edge 1d surrounding the bead rod 3, as shown in Fig. 5 of the drawings. The opposite end 11b of this toggle hook 11 is channel shaped in cross-section as shown in Figs. 5 and 6 of the drawings, and pivoted intermediate the legs of the channel shaped end portion 11b is the toggle lever 12 which is substantially L shaped and pivoted on a pin 12a to the toggle bracket 13, stationarily secured on the tractor by means of bolts 13a. It will be here noted that the bolt 11c extending through the end 11b of the toggle hook 11 and the toggle lever 12 is adapted to pass over center of the pin 12a with respect to the bead rod 3, so that the toggle assembly, including the hook 11, lever 12 and bracket 13, provide a rigid fixed connection of the beaded edge 1d of the fender body 1 with the tractor, in the position as shown in Fig. 5 of the drawings.

The operation of our tractor fender is substantially as follows: When in the position as shown in Fig. 1 of the drawings, the toggle hook 11a intermediate the bumper pads 9 and 10 exerts lateral stress in the top plate portion 1b of the fender body 1 and the beaded edge 1d at the inner side thereof which causes firm, forcible engagement of the bumper pads 9 and 10 with the tractor structure and also tightens the bead rod 3 within the hinge sleeve 6 at both ends of the tractor fender, so that vibration of the fender and vibrational noises are reduced to a minimum. The resilient action of the pad 10a, bumper pads 9 and 10, dampens vibration and consequent amplification of noise in the side and top plates 1a and 1b of the fender body 1. The particular construction of the hinges, wherein the bead rod 3 extends through the hinges and continually around the edges of the fender, provides a structure which is very durable and does not crack or fail in any way at the hinge locations where the sheet metal terminates therewith in surrounding relationship with the bead rod 3. The frontal downwardly curved portion 2b of the nose portion 2 extending below the hinge axis formed by the bead rod 3, serves as a buffer for low limbs and fruit, preventing such low limbs being damaged by the traction of the tractor. This feature is cooperative with the short radius from the hinge center line to the outer line of the fender, which permits close mounting of the side of the fender to the outer sides of the tracks, so that downward and outward pivotal movement of the fender does not cause interference of the edges of the fender in such close mounted relationship with the outer edges of the tracks.

Though we have shown and described a particular construction, combination and arrangement, of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a tractor fender of the class described, the combination of a fender body having a curved nose portion, a bead rod, the outer edges of said fender body and nose section provided with rolled portions surrounding said bead rod and a hinge sleeve pivotally mounted on said bead rod on each opposite end of said fender body.

2. In a tractor fender of the class described, the combination of a fender body having a curved nose portion, a bead rod, the outer edges of said fender body and nose section provided with rolled portions surrounding said bead rod and a hinge sleeve pivotally mounted on said bead rod on each opposite end of said fender body, spacers at opposite ends of said hinge sleeve fixed relatively to said bead rod.

3. In a tractor fender of the class described, the combination of a fender body having a curved nose portion, a bead rod, the outer edges of said fender body and nose section provided with rolled portions surrounding said bead rod and a hinge sleeve pivotally mounted on said bead rod on each opposite end of said fender body, spacers at opposite ends of said hinge sleeve fixed relatively to said bead rod, said rolled surrounding portion of said fender body welded to said spacers fixing the same relatively to said rod.

4. In a tractor fender of the class described, the combination of a fender body having a curved nose portion, a bead rod, the outer edges of said fender body and nose section provided with rolled portions surrounding said bead rod and a hinge sleeve pivotally mounted on said bead rod on each opposite end of said fender body, spacers at opposite ends of said hinge sleeve fixed relatively to said bead rod, said rolled surrounding portion of said fender body welded to said spacers fixing the same relatively to said rod, an arm connected to said sleeve, a bracket adapted to be fixed to a tractor, a bolt pivotally connecting said arm to said bracket, said bracket provided with a slotted portion spaced from said bolt, and a second bolt extending through said slotted portion and said arm, providing for vertical adustment of said sleeve relatively to said bracket.

5. In a tractor fender of the class described, the combination of a fender body having a curved nose portion, a bead rod, the outer edges of said fender body and nose section provided with rolled portions surrounding said bead rod and a hinge sleeve pivotally mounted on said bead rod on each opposite end of said fender body, said nose section curved downwardly, forwardly of said hinged sleeve, below the axis of said bead rod which forms the axis for said hinged sleeve.

6. In a tractor fender of the class described, the combination of a fender body having curved ends and top and side plate portions, the lower edge of said side plate portions having a continuous loop portion, a bead rod in said loop portion, a hinge sleeve pivotally mounted on said bead rod on each opposite end of said fender body.

7. In a tractor fender of the class described, the combination of a fender body having curved ends and top and side plate portions, the lower edge of said side plate portion having a continuous loop portion, a bead rod in said loop portion, a hinge sleeve pivotally mounted on said bead rod on each opposite end of said fender body, spacers at opposite ends of each of said sleeves, fixed to the material of said fender body.

8. In a tractor fender of the class described, the combination of a fender body having curved ends and top and side plate portions, the lower edge of said slide plate portion having a continuous loop portion, a bead rod in said loop portion, a hinge sleeve pivotally mounted on said bead rod near each opposite end of said fender body, spacers at opposite ends of each of said sleeves, fixed to the material of said fender body, an arm in connection with each of said sleeves, a bracket at each end of said fender body adapted to be fixed to a tractor, each of said arms vertically adjustably connected with each of said brackets.

9. In a tractor fender of the class described, a fender body having side plate portions and top plate portions, hinges near the lower edge of said plate portions, near each opposite end of the fender, bumper pads positioned at the inner edge of the top plate portions, each spaced from the middle portion of the fender, and toggle hook means intermediate said bumper pads, fixed to the structure of a tractor, engageable with the edge of said top plate portions for exerting force on the upper edge of said fender toward said tractor for firmly engaging said bumper pads with the structure of said tractor at opposite sides of said toggle hook.

10. In a tractor fender of the class described, a fender body having side plate portions and top plate portions, hinges near the lower edge of said side plate portions, near each opposite end of the fender, bumper pads, positioned at the inner edge of the top plate portions, each spaced from the middle portion of the fender, and toggle hook means intermediate said bumper pads, fixed to the structure of a tractor, engageable with the edge of said top plate portions for exerting force on the upper edge of said fender toward said tractor for firmly engaging said bumper pads with the structure of said tractor at opposite sides of said toggle hook, said toggle hook having a curved portion, the inner edge of said fender body having a rolled portion and a bead rod internally of the rolled portion.

11. In a tractor fender of the class described, the combination of a fender body having a curved nose portion, a bead rod, the outer edges of said fender body and nose section provided with rolled portions surrounding said bead rod and a hinge sleeve pivotally mounted on said bead rod on each opposite end of said fender body, a bushing inwardly of said sleeve welded at its opposite ends to said rolled portions.

12. In a tractor fender of the class described, the combination of a fender body having a curved nose portion, a bead rod, the outer edges of said fender body and nose section provided with rolled portions surrounding said bead rod and a hinge sleeve pivotally mounted on said bead rod on each opposite end of said fender body, spacers at opposite ends of said hinge sleeve fixed relatively to said bead rod, a bushing inwardly of said sleeve surrounding said rod and welded at its opposite ends to said spacers and rolled portions.

JOHN M. BOWMAN.
PAUL D. BRADFIELD.

REFERENCES CITED

The following references are of record in the file of this patent:

UNITED STATES PATENTS

| Number | Name | Date |
| --- | --- | --- |
| 430,798 | Dion | June 24, 1890 |
| 1,052,511 | Patterson | Feb. 11, 1913 |
| 1,654,362 | Campbell | Dec. 27, 1927 |
| 1,854,174 | Bowman | Apr. 19, 1932 |
| 2,211,654 | Heaslet | Aug. 13, 1940 |
| 2,309,898 | Hansen | Feb. 2, 1943 |

FOREIGN PATENTS

| Number | Country | Date |
| --- | --- | --- |
| 361,023 | Italy | July 11, 1938 |